United States Patent
Weksler et al.

(10) Patent No.: US 9,491,576 B2
(45) Date of Patent: Nov. 8, 2016

(54) LOCATION BASED AUTOMATED MEETING ATTENDANCE

(71) Applicant: Lenovo (Singapore) Pte. Ltd., Singapore (SG)

(72) Inventors: Arnold S. Weksler, Raleigh, NC (US); John Carl Mese, Cary, NC (US); Rod D Waltermann, Rougemont, NC (US); Nathan J. Peterson, Durham, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/494,025

(22) Filed: Sep. 23, 2014

(65) Prior Publication Data
US 2016/0088435 A1    Mar. 24, 2016

(51) Int. Cl.
*H04M 3/56* (2006.01)
*H04W 4/02* (2009.01)
*H04M 1/725* (2006.01)

(52) U.S. Cl.
CPC ......... *H04W 4/021* (2013.01); *H04M 1/72572* (2013.01); *H04M 1/72566* (2013.01)

(58) Field of Classification Search
CPC   H04W 4/021; H04M 2215/815; H04M 3/56
USPC ......... 455/414, 416, 414.1, 414.2; 705/8, 9, 705/7.19; 370/260, 261, 262; 701/117
See application file for complete search history.

(56) References Cited

U.S. PATENT DOCUMENTS

| | | | | |
|---|---|---|---|---|
| 7,027,995 | B2* | 4/2006 | Kaufman | G06Q 10/109 705/7.12 |
| 7,139,722 | B2* | 11/2006 | Perrella | G06Q 10/06311 701/533 |
| 2007/0049261 | A1* | 3/2007 | Joglekar | H04M 1/72566 455/416 |
| 2010/0208625 | A1* | 8/2010 | Logan | G06Q 10/109 370/260 |
| 2013/0064142 | A1* | 3/2013 | Bhow | 370/260 |
| 2013/0096813 | A1* | 4/2013 | Geffner et al. | 701/117 |

* cited by examiner

*Primary Examiner* — Kamran Afshar
*Assistant Examiner* — Farid Seyedvosoghi
(74) *Attorney, Agent, or Firm* — Schwegman Lundberg & Woessner, P.A.

(57) ABSTRACT

A method includes determining a physical location and start time of a meeting stored in a calendar entry of a mobile device, determining a current location of the mobile device, determining a time to reach the physical location of the meeting from the current location, identifying connection information suitable to electronically connect to the meeting, and if the time to reach the physical location of the meeting exceeds a time remaining to the start time of the meeting, initiating a connection to the meeting.

23 Claims, 5 Drawing Sheets

LOCATION BASED AUTOMATED MEETING ATTENDANCE

BACKGROUND

Many meetings provide for in person attendance at a specified location, and alternatively a remote conference alternative, such as a conference call number or network based audio and/or video conferencing application. Users may be working in remote locations, or may be traveling on their way to a meeting. If traveling to the meeting and stuck in traffic, it may be difficult or unsafe to manually attempt to join the meeting electronically via the remote conference alternative.

SUMMARY

A method includes determining a physical location and start time of a meeting stored in a calendar entry of a mobile device, determining a current location of the mobile device, determining a time to reach the physical location of the meeting from the current location, identifying connection information suitable to electronically connect to the meeting, and if the time to reach the physical location of the meeting exceeds a time remaining to the start time of the meeting, initiating a connection to the meeting.

A machine readable storage device having instructions for execution by a processor of the machine to perform determining a physical location and start time of a meeting stored in a calendar entry of a mobile device, determining a current location of the mobile device, determining a time to reach the physical location of the meeting from the current location, identifying connection information suitable to electronically connect to the meeting, and if the time to reach the physical location of the meeting exceeds a time remaining to the start time of the meeting, initiating a connection to the meeting.

A mobile device includes a processor, a display coupled to the processor, a position system coupled to the processor to provide a location of the mobile device, and a memory device having a program stored thereon for execution by the processor. The processor executes the code to determine a physical location and start time of a meeting stored in a calendar entry of a mobile device, determine a current location of the mobile device, determine a time to reach the physical location of the meeting from the current location, identify connection information suitable to electronically connect to the meeting, and if the time to reach the physical location of the meeting exceeds a time remaining to the start time of the meeting, initiating a connection to the meeting.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A portable device synchronizes a meeting location with a current location and extrapolates if a user of the device will arrive to the meeting on time. If the user is going to be late, an alert will popup offering to dial the conference number based on proximity to the meeting. Also the device can find a meeting chair in the user's contacts or calendar meeting entry, and offer to message them that they will be late, and dial in. The portable phone will then automatically dial into the conference number or conferencing application link, provided one is supplied via a calendar entry. In addition, the portable phone can keep up with frequently scheduled meetings and keep conference numbers by synchronizing with the meetings.

Additionally a history of meeting locations (gathered by a position system such as a GPS (global positioning system) module, or Wireless fingerprinting module, etc.) may also be held by the portable phone so that references to Building 1, 2, or 3 will be mapped to a location. In this way, the device will be able to reference locations based on name references over time. In some embodiments, the time taken to reach a particular conference room once a building is reached may be used to estimate the time needed to reach the meeting.

Figure 1:
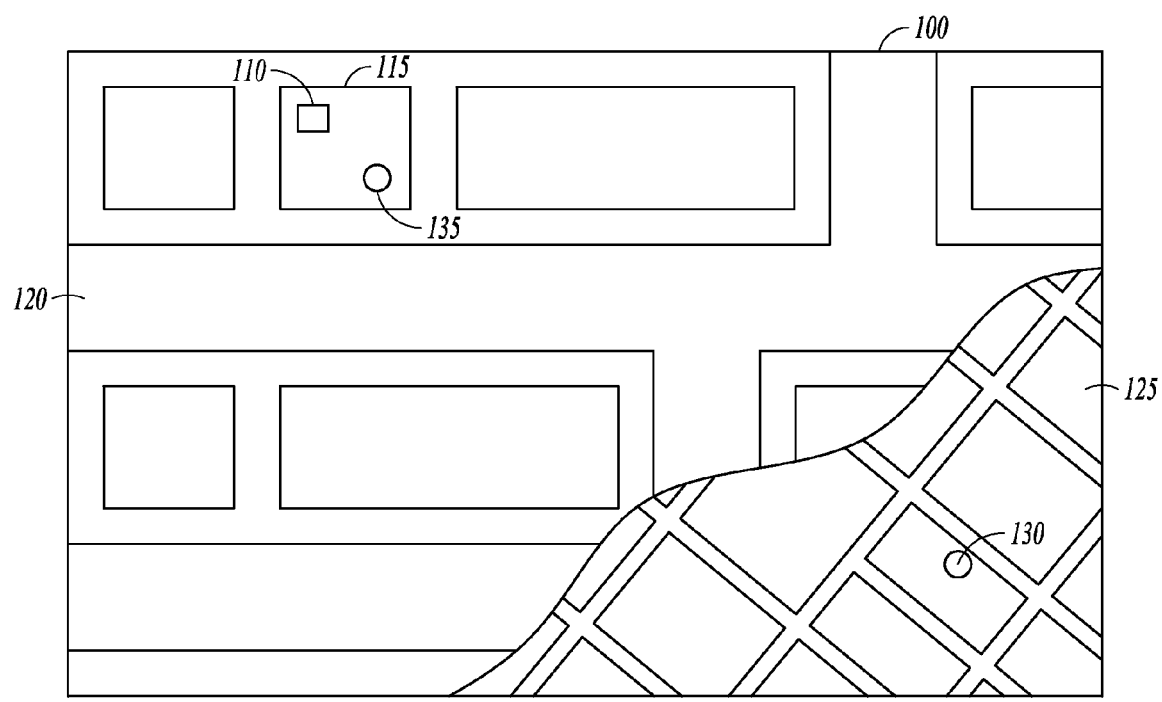
FIG. 1 is a block diagram representation of spatial relationships between a meeting location and various meeting participant locations according to an example embodiment.

FIG. 1 is a block diagram representation of a map 100 showing a meeting location and various meeting participant locations according to an example embodiment. In one embodiment, a meeting location 110, such as a conference room in a building 115 is shown in a first portion 120 of map 100. The first portion 120 shows multiple buildings around building 115 at a first scale showing buildings. A second portion 125 of map 100 utilizes a second scale and shows roads and is used to illustrate that a mobile device 130 of a user may be several miles away from the meeting location 110. A second mobile device 135 is shown located in the same building 115 as the meeting location 110. Each mobile device may obtain a location of the device, and also calculate the time it would take a user of the respective mobile devices to reach the meeting location. If that time is longer than the beginning of a meeting time, the mobile device may initiate a connection to the meeting. Such initiation may happen automatically, or mobile device may provide a notification to the user regarding that fact, and offer to establish a connection to the meeting so the user may begin participating in the meeting remotely when the meeting begins.

Figure 2:
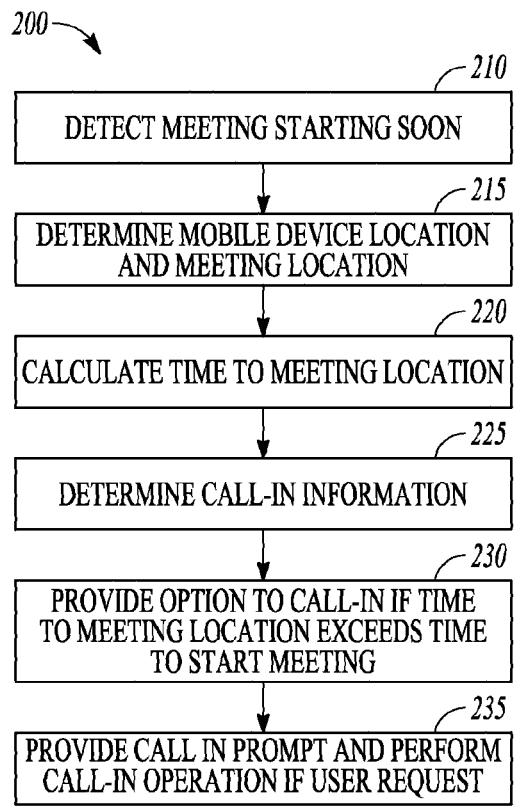
FIG. 2 is a flowchart illustrating a method of determining if a user of a mobile device can arrive at a scheduled meeting by the start of the meeting according to an example embodiment.

FIG. 2 is a flowchart illustrating a method 200 of determining if a user of a mobile device can arrive at a scheduled meeting by the start of the meeting according to an example embodiment. Method 200 may run on a mobile device that has a calendar with meeting entries showing a location of the meeting and may also provide information to enable an electronic connection to the meeting such as conference call information or an application that facilitates a network based connection into the meeting.

At 210, the mobile device detects that a meeting is approaching. Such detection may occur coincident with a reminder notification. The time for reminder notifications may be selected by a user, or otherwise provided. Typical notices occur five to fifteen minutes prior to the start of the meeting. At 215, the mobile device determines a physical location and start time of a meeting stored in a calendar entry of a mobile device, and also determines a current location of the mobile device.

The mobile device then determines a time to reach the physical location of the meeting from the current location at 220. The time to reach the physical location may be aided by use of a networked mapping services in some embodiments, and may also be determined based on recorded prior travel times to reach the meeting from the same current location. The mobile device may perform the calculations, or a networked server may be used to aid or perform the calculations in various embodiments.

At 225, the mobile device identifies connection information suitable to electronically connect to the meeting. The connection information may be derived from the calendar entry by recognizing a phone number and access code, or a link to join the meeting via a web based conferencing application such as Zoom or WebEx. If the time to reach the physical location of the meeting exceeds a time remaining to the start time of the meeting, the user may be provided an option to connect to the meeting via the mobile device at 230. The option may be a message indicating the time needed to reach the meeting. At 235, the mobile device may provide an indication on the mobile device prompting a user with an offer to electronically connect to the meeting, and perform the connection if the user requests the connection. The user may be prompted with an icon or other selectable user interface element to indicate the user desires the connection. The message may also be an audible message, and the user interface element may include acceptance of voice commands. In further embodiments, the connection may automatically occur without prompt. The user may be provided with various setting options to specify whether the connection is made automatically or after prompting.

Figure 3:
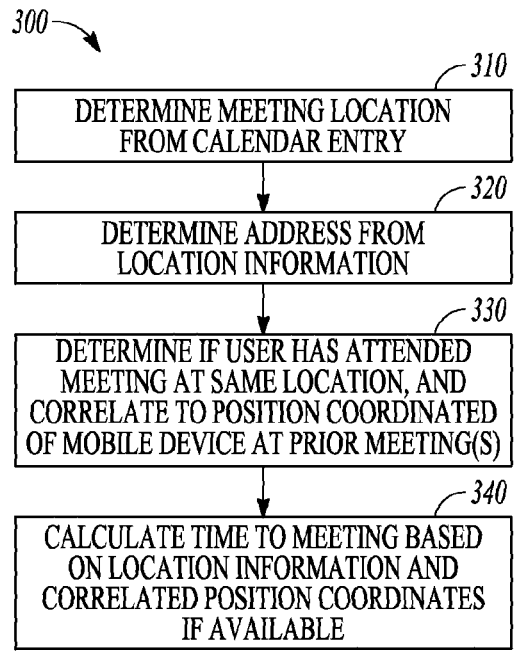
FIG. 3 is a flowchart illustrating a method of calculating time to reach a meeting from a current location according to an example embodiment.

FIG. 3 is a flowchart illustrating a method 300 of calculating time to reach a meeting from a current location according to an example embodiment. At 310, a meeting location is determined from a calendar entry on a mobile device. At 320, the address of the meeting location is determined from the location information. Method 300 may determine if the user has attended the meeting at the same location before, and correlate the position coordinates detected by the mobile device while at the meeting at 300. Such correlated position coordinates may be more accurate than the coordinates derived via GPS services given a location address, as the address may correspond to a large business with a large campus of buildings. The time to reach the actual meeting location may be longer than that needed to reach the corresponding address. At 340, the time to reach the meeting from the current location and correlated position coordinates is calculated. By using information regarding location, and optionally prior times to reach the correlated position coordinate from the current location of the mobile device, a more accurate estimate of the time to reach the meeting and attend in person may be obtained. This method may be repeated periodically as the time of the meeting approaches to provide an updated estimate of the time to reach the meeting, and may also be repeated once the meeting has started and even while a user is participating electronically.

Figure 4:
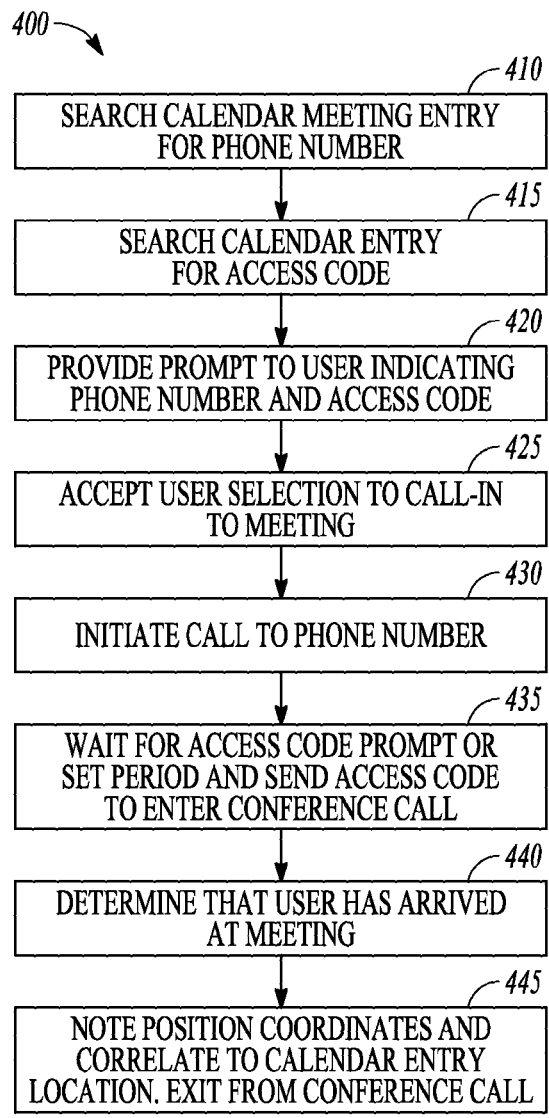
FIG. 4 is a flowchart illustrating a method of automated calling into a meeting according to an example embodiment.

FIG. 4 is a flowchart illustrating a method 400 of automated calling into a meeting according to an example embodiment. Method 400 begins by the mobile device searching a calendar meeting entry for a phone number, or alternatively a link to a web conference at 410. At 415, the meeting entry is searched for an access code or other information needed to connect to a web conference. At 420, a prompt may be provided to a user of the mobile device indicating the connection information has been obtained, and requesting if the user would like to use the connection information to attend the meeting electronically. At 425, the user may select to attend the meeting electronically via touching a user interface element, voice command, or other means of indicating that the user desired to attend the meeting electronically. In further embodiments, the connection may be established automatically without prompting the user.

A call or network based connection is then initiated at 430, using the connection information such as telephone number or link. At 435, method 400 may wait for a prompt to provide the access code or other information, and provide such information when the prompt is detected. Alternatively, a predetermined amount of time may elapse before the access code is provided. At this point, the user may be placed into the conference call or web conferencing application and may be able to participate in the meeting remotely.

In one embodiment, the mobile device may detect that the user has arrived at the meeting at 440, or is very close to the meeting location. A user may be prompted to confirm that the meeting location has been reached, and it is desired that the remote connection be discontinued. If the user confirms that they have reached the meeting and wish to disconnect from the electronic connection, at 445, the position coordinates of the mobile device may be obtained and correlated to the calendar entry location. The mobile device may also exit from the electronic connection.

Figure 5:
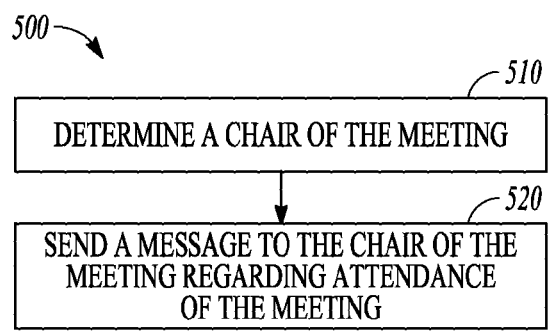
FIG. 5 is a flowchart illustrating a method of notifying a chair of a meeting of attendance status according to an example embodiment.

FIG. 5 is a flowchart illustrating a method 500 of notifying a chair of a meeting of attendance status according to an example embodiment. At 510, the method 500 determines a chair of the meeting from the calendar entry. Once the chair is known, at 520, contact information for the chair is obtained, either from a corporate director, the meeting entry, or personal contacts of the user of the mobile device, and a message is sent to the chair regarding attendance of the meeting by the user of the mobile device. In some embodiments, if the meeting was established by an emailed meeting notice from the chair, the meeting notice may contain contact information for the chair of the meeting.

Figure 6:
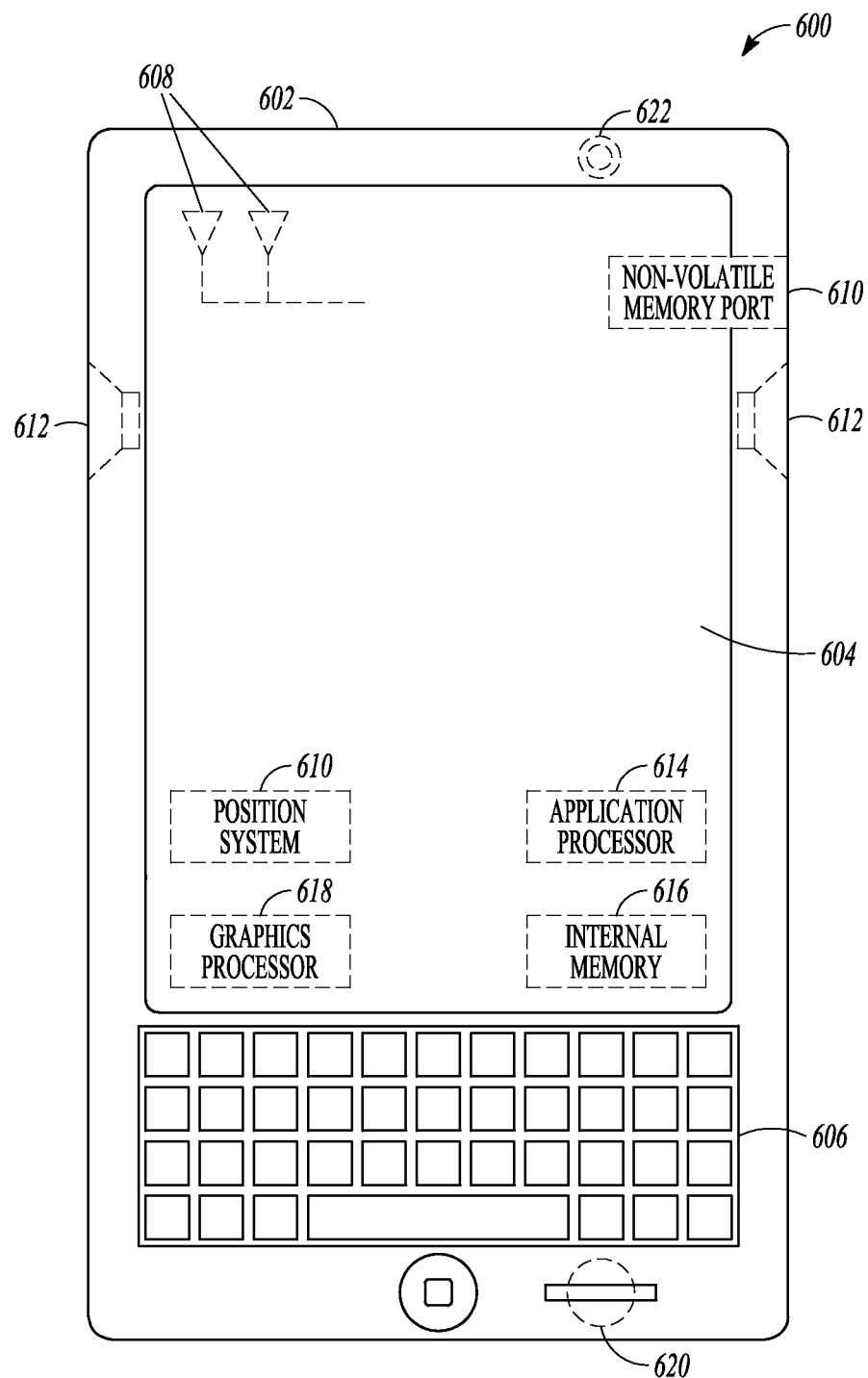
FIG. 6 is a block diagram of a mobile device for implementing example embodiments.

FIG. 6 is a block diagram of a mobile device 600 utilized to perform methods according to various embodiments. The mobile device 600 may be a tablet type of device, smart phone, or laptop computer in various embodiments. The mobile device 600 may include one or more antennas 608 within housing 602 that are configured to communicate with a hotspot, base station (BS), an evolved NodeB (eNodeB), or other type of WLAN or WWAN access point. The mobile device may be configured to communicate using multiple wireless communication standards, including standards selected from 3GPP LTE/LTE-A, WiMAX, High Speed Packet Access (HSPA), Bluetooth, and Wi-Fi standard definitions. The mobile device 600 may communicate using separate antennas for each wireless communication standard or shared antennas for multiple wireless communication standards. The mobile device 600 may communicate in a WLAN, a WPAN, and/or a WWAN.

Mobile device 600 may also include a positioning system 610 which may use triangulation via one or more networks it is connected to, or may be a global positioning system utilizing satellite GPS signals to provide a location of the mobile device 600. Mobile device 600 may also include a microphone 620 and one or more speakers 612 that may be used for audio input and output from the mobile device 600. A display screen 604 may be a liquid crystal display (LCD) screen, or other type of display screen such as an organic light emitting diode (OLED) display. The display screen 604 may be configured as a touch screen. The touch screen may use capacitive, resistive, or another type of touch screen technology. An application processor 614 and a graphics processor 618 may be coupled to internal memory 616 to provide processing and display capabilities. A non-volatile memory port 610 may also be used to provide data input/output options to a user. The non-volatile memory port 610 may also be used to expand the memory capabilities of the mobile device 600. A keyboard 606 may be integrated with the mobile device 600 or wirelessly connected to the mobile device 600 to provide additional user input. A virtual keyboard may also be provided using the touch screen. A camera 622 located on the front (display screen) side or the rear side of the mobile device 600 may also be integrated into the housing 602 of the mobile device 600.

Figure 7:
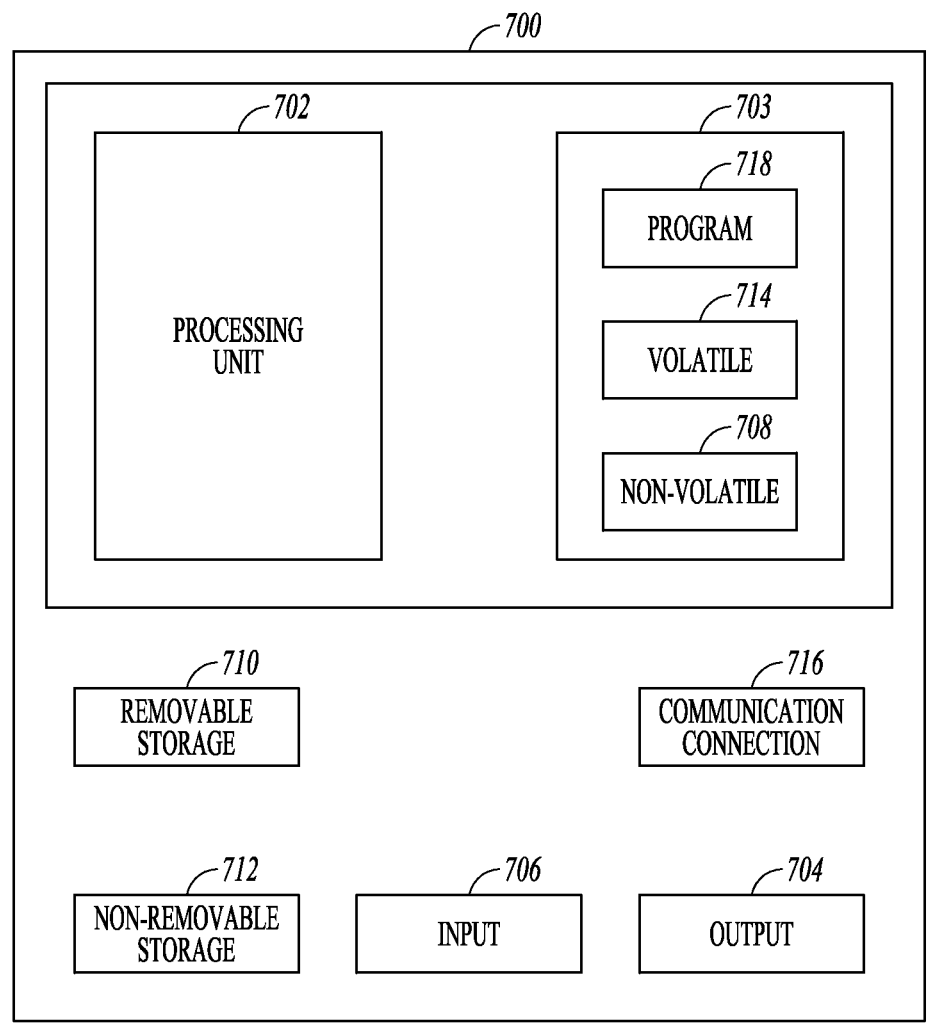
FIG. 7 is a block diagram of computer system used to implement methods according to an example embodiment.

FIG. 7 is a block schematic diagram of a computer system 700 to implement methods according to example embodiments. All components need not be used in various embodiments. One example computing device in the form of a computer 700, may include a processing unit 702, memory 703, removable storage 710, and non-removable storage 712. Memory 703 may include volatile memory 717 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. Output 704 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium or storage device are executable by the processing unit 702 of the computer 700. A hard drive, CD-ROM, and RAM are some examples of articles including a non-transitory computer-readable medium such as a storage device. The terms computer-readable medium and storage device do not include carrier waves. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

EXAMPLES

1. A method comprising:
    determining a physical location and start time of a meeting stored in a calendar entry of a mobile device;
    determining a current location of the mobile device;
    determining a time to reach the physical location of the meeting from the current location;
    identifying connection information to electronically connect to the meeting; and
    if the time to reach the physical location of the meeting exceeds a time remaining to the start time of the meeting, initiating a connection to the meeting.

2. The method of example 1 wherein initiating a connection to the meeting comprises providing an indication on the mobile device prompting a user with an offer to electronically connect to the meeting.

3. The method of example 2 and further comprising using the connection information to connect to the meeting based on the user accepting the offer to electronically connect to the meeting.

4. The method of example 1 and further comprising:
    detecting that the mobile device is at the meeting location;
    prompting the user to disconnect from the meeting; and
    disconnecting from the meeting based on user acceptance of the prompt.

5. The method of example 1 and further comprising:
    detecting that the mobile device is at the meeting location;
    determining the location of the mobile device at the meeting; and
    associating the determined location with the meeting location specified in the meeting calendar entry.

6. The method of example 1 wherein the connection information comprises a phone number and an access code.

7. The method of example 1 wherein the connection information comprises a link to a web based conference connection.

8. The method of example 1 wherein determining a meeting location comprises determining an address from the physical location utilizing a map service via a network.

9. The method of example 8 wherein the map service is used to determine the time to reach the meeting.

10. The method of example 1 wherein determining a physical location of the meeting comprises deriving the physical location from location information derived from a mobile device while attending a prior meeting at the physical location.

11. The method of example 1 and further comprising:
determining a chair of the meeting from the calendar entry; and
sending a message to the chair regarding attendance of the meeting.

12. A machine readable storage device having instructions for execution by a processor of a machine, the instruction comprising instructions to perform:
determining a physical location and start time of a meeting stored in a calendar entry of a mobile device;
determining a current location of the mobile device;
determining a time to reach the physical location of the meeting from the current location;
identifying connection information suitable to electronically connect to the meeting; and
if the time to reach the physical location of the meeting exceeds a time remaining to the start time of the meeting, initiating a connection to the meeting.

13. The device of example 12 wherein initiating a connection to the meeting comprises providing an indication on the mobile device prompting a user with an offer to electronically connect to the meeting.

14. The device of example 13 wherein the method further comprises using the connection information to connect to the meeting based on the user accepting the offer to electronically connect to the meeting.

15. The device of example 12 wherein the method further comprises:
detecting that the mobile device is at the meeting location;
prompting the user to disconnect from the meeting; and
disconnecting from the meeting based on user acceptance of the prompt.

16. The device of example 12 wherein the method further comprises:
determining the location of the mobile device at the meeting; and
associating the determined location with the meeting location specified in the meeting calendar entry.

17. The device of example 12 wherein the connection information comprises a phone number and an access code.

18. The device of example 12 wherein the connection information comprises a link to a web based conference connection.

19. The device of example 12 wherein determining a physical location of the meeting comprises deriving the physical location from location information derived from a mobile device while attending a prior meeting at the physical location.

20. A mobile device comprising:
a processor;
a display coupled to the processor;
a position system coupled to the processor to provide a location of the mobile device; and
a memory device having a program stored thereon for execution by the processor to:
determine a physical location and start time of a meeting stored in a calendar entry of a mobile device;
determine a current location of the mobile device;
determine a time to reach the physical location of the meeting from the current location;
identify connection information suitable to electronically connect to the meeting; and
if the time to reach the physical location of the meeting exceeds a time remaining to the start time of the meeting, initiating a connection to the meeting.

21. The device of example 20 wherein initiating a connection to the meeting comprises providing an indication on the mobile device prompting a user with an offer to electronically connect to the meeting.

22. The mobile device of example 21 wherein the processor executes the program to further use the connection information to connect to the meeting based on the user accepting the offer to electronically connect to the meeting.

23. The mobile device of example 21 wherein the processor executes the program to further:
detect that the mobile device is at the meeting location;
prompt the user to disconnect from the meeting; and
disconnect from the meeting based on user acceptance of the prompt.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
determining a physical location and start time of a meeting stored in a calendar entry of a mobile device;
determining a current location of the mobile device;
determining via the mobile device, a time to reach the physical location of the meeting from the current location;
identifying connection information to electronically connect to the meeting; and
if the time to reach the physical location of the meeting exceeds a time remaining to the start time of the meeting, initiating, by the mobile device, a connection to the meeting, including automatically calling a conference number and providing an access code to connect to the meeting via the mobile device.

2. The method of claim 1 wherein initiating a connection to the meeting comprises providing an indication on the mobile device prompting a user with an offer to automatically electronically connect to the meeting.

3. The method of claim 2 and further comprising using the connection information to connect to the meeting based on the user accepting the offer to electronically connect to the meeting.

4. The method of claim 1 and further comprising:
detecting that the mobile device is at the meeting location;
prompting the user to disconnect from the meeting; and
disconnecting from the meeting based on user acceptance of the prompt.

5. The method of claim 1 and further comprising:
detecting that the mobile device is at the meeting location;
determining the location of the mobile device at the meeting; and
associating the determined location with the meeting location specified in the meetir calendar entry.

6. The method of claim 1 wherein the connection information comprises a phone number and an access code.

7. The method of claim 1 wherein the connection information comprises a link to a web based conference connection.

8. The method of claim 1 wherein determining a meeting location comprises determining an address from the physical location utilizing a map service via a network, and wherein the location is correlated to position coordinates detected by the mobile device while at a previous meeting at the same physical location.

9. The method of claim 8 wherein the map service is used to determine the time to reach the meeting and wherein the time is also a function of recorded prior travel times to reach the meeting.

10. The method of claim 1 wherein determining a physical location of the meeting comprises deriving the physical location from location information derived from a mobile device while attending a prior meeting at the physical location.

11. The method of claim 1 and further comprising:
determining, via the mobile device, a chair of the meeting from the calendar entry; and
sending a message to the chair regarding attendance of the meeting.

12. A machine readable storage device having instructions for execution by a processor of a mobile device, the instruction comprising instructions to perform:
determining, via the processor of the mobile device, a physical location and start time of a meeting stored in a calendar entry of a mobile device;
determining a current location of the mobile device;
determining, via the processor of the mobile device, a time to reach the physical location of the meeting from the current location;
identifying, via the processor of the mobile device, connection information suitable to electronically connect to the meeting; and
if the time to reach the physical location of the meeting exceeds a time remaining to the start time of the meeting, initiating via the processor of the mobile device, a connection to the meeting, including automatically calling a conference number and providing an access code to connect to the meeting via the mobile device.

13. The device of claim 12 wherein initiating a connection to the meeting comprises providing an indication on the mobile device prompting a user with an offer to electronically connect to the meeting.

14. The device of claim 13 wherein the method further comprises using the connection information to connect to the meeting based on the user accepting the offer to electronically connect to the meeting.

15. The device of claim 12 wherein the method further comprises:
detecting that the mobile device is at the meeting location;
prompting the user to disconnect from the meeting; and
disconnecting from the meeting based on user acceptance of the prompt.

16. The device of claim 12 the method further comprises:
determining the location position coordinates of the mobile device at the meeting; and
associating the determined location position coordinates with the meeting location specified in the meeting calendar entry.

17. The device of claim 12 wherein the connection information comprises a phone number and an access code.

18. The device of claim 12 wherein the connection information comprises a link to a web based conference connection.

19. The device of claim 12 wherein determining a physical location of the meeting comprises deriving the physical location from location information derived from a mobile device while attending a prior meeting at the physical location.

20. A mobile device comprising:
a processor;
a display coupled to the processor;
a position system coupled to the processor to provide a location of the mobile device; and
a memory device having a program stored thereon for execution by the processor to:
determine via the processor of the mobile device, a physical location and start time of a meeting stored in a calendar entry of a mobile device;
determine a current location of the mobile device;
determine via the processor of the mobile device, a time to reach the physical location of the meeting from the current location;
identify connection information suitable to electronically connect to the meeting; and
if the time to reach the physical location of the meeting exceeds a time remaining to the start time of the meeting, initiating via the processor of the mobile device, a connection to the meeting, including automatically calling a conference number and providing an access code to connect to the meeting via the mobile device.

21. The device of claim 20 wherein initiating a connection to the meeting comprises providing an indication on the mobile device prompting a user with an offer to electronically connect to the meeting.

22. The mobile device of claim 21 wherein the processor executes the program to further use the connection information to connect to the meeting based on the user accepting the offer to electronically connect to the meeting.

23. The mobile device of claim 21 wherein the processor executes the program to further:
detect that the mobile device is at the meeting location;
prompt the user to disconnect from the meeting; and
disconnect from the meeting based on user acceptance of the prompt.

* * * * *